United States Patent [19]

Dupart et al.

[11] Patent Number: 5,449,281
[45] Date of Patent: Sep. 12, 1995

[54] APPARATUS FOR PREPARING SHAPED CO-EXTRUDED PRODUCTS

[75] Inventors: Pierre Dupart, Preverenges; Osvaldo Geromini, Rances, both of Switzerland; Minas Zafiropoulos, Corbie, France

[73] Assignee: Nestec S.A., Vevey, Switzerland

[21] Appl. No.: 192,161

[22] Filed: Feb. 4, 1994

[30] Foreign Application Priority Data

Oct. 8, 1993 [EP] European Pat. Off. ............ 93116294

[51] Int. Cl.$^6$ ................................. A23P 1/00
[52] U.S. Cl. .................. 425/131.1; 425/133.1; 425/237; 425/325
[58] Field of Search .................. 425/131.1, 133.5, 237, 425/325, 133.1; 426/284

[56]  References Cited

U.S. PATENT DOCUMENTS

| 3,547,682 | 12/1970 | Erb ..................... 425/133.5 |
| 4,533,308 | 8/1985 | Cloeren .................... 425/133.5 |
| 5,198,257 | 3/1993 | Heck et al. ................. 426/512 |

FOREIGN PATENT DOCUMENTS 0251630  1/1988  European Pat. Off. .
2114418  8/1983  United Kingdom .

OTHER PUBLICATIONS

Minifie, *Chocolate, Cocoa, and Confectionery: Science and Technology*, Third Edition, Van Nostrand Reinhold, Chapman and Hall, N.Y., pp. 547–550, 1989.

*Primary Examiner*—George Yeung
*Attorney, Agent, or Firm*—Vogt & O'Donnell

[57]  ABSTRACT

An extruder for extruding a foodstuff terminates in an extrusion head having a product outlet die and having a feed duct pipe for feeding a foodstuff filler material into the foodstuff extruded through the head so that the extruded foodstuff encases the filler material so that a foodstuff-encased product passes through the outlet die. A shaper is positioned for receiving the encased product directly from the die outlet and has an inner rotatable ring body mold and outer rotatable annulus molds, wherein the outer annulus molds are positioned about and off-center of and are rotatable with the ring mold so that upon rotation, the annulus molds and ring mold body converge for shaping the encased product and then the annulus molds separate from the shaped product. A cooling system is positioned for receiving the shaped product and cooling the shaped product.

7 Claims, 2 Drawing Sheets

APPARATUS FOR PREPARING SHAPED CO-EXTRUDED PRODUCTS

BACKGROUND OF THE INVENTION

The invention concerns a process and device for obtaining a coextruded product comprising an outer casing and a filling.

Processes enabling coextruded products to be manufactured are already known. The patent European Patent Application Publication No. 487757 concerns a process for producing a coextruded product with a cereal-based outer casing.

The disadvantage of this process is that it does not enable a product to be obtained with an outer casing of uniform thickness, because the shaping time of the product is too short to guarantee such a result. This causes difficulty in particular if it is intended to produce a product in which the filling is in liquid, semi-liquid or powder form.

SUMMARY OF THE INVENTION

The object of the present invention is to perfect a process which enables a coextruded product with a filling in liquid, semi-liquid or powder form to be manufactured, in which the risks of obtaining a product with a filling that would be likely to run or to be visible from the outside are minimised.

This process can be used for food both for human and animal consumption. In addition, the invention concerns the device for implementing the process.

The invention provides a process for obtaining a coextruded product having an outer casing and a filling, in which the outer casing is extruded and the filling is caused to arrive at the outlet from the extrusion die so as to form a coextruded sausage which then passes into a shaper to be moulded by means of a pressure roller, and the product obtained is cooled. When the outer casing is extruded, the process is one of combined cooking and extrusion.

In addition, the invention provides an apparatus for implementing the process which comprises an extruder, a co-extruder head, a shaper and a cooling system. The extruder die outlet may be round.

In particular, an apparatus of the present invention includes an extruder for extruding a foodstuff wherein the extruder terminates in an extrusion head having a product outlet die and having a feed duct pipe for feeding a foodstuff filler material into the foodstuff extruded through the head so that the extruded foodstuff encases the filler material so that a foodstuff-encased product passes through the outlet die. The shaper is positioned for receiving the encased product directly from the die outlet and has an inner rotatable ring body mold and outer rotatable annulus molds, wherein the outer annulus molds are positioned about and off-center of and are rotatable with the ring mold so that upon rotation, the annulus molds and ring mold body converge for shaping the encased product and then the annulus molds separate from the shaped product. The cooling system is positioned for receiving the shaped product and cooling the shaped product.

DETAILED DESCRIPTION OF THE INVENTION

In accordance with the invention, if the process is carried out to obtain an animal foodstuff, the mixture for the outer casing which passes through the extruder is a mixture of a suspension of textured meat or fish, a flour made from cereals and starchy foods and a solution of phosphoric acid and an additive to lessen the activity of the water.

Textured meat or fish should be taken to mean a meat or fish paste in which the functional properties of the proteins have been partially or completely modified by heat and mechanical treatment and by means of bonding agents at the time of extrusion. Meat is taken to mean the meat of chicken, rabbits, cattle or sheep, or meal obtained from the carcasses of the aforesaid animals or offal. Offal is taken to mean lobes of the lung as well as livers and kidneys. Fish is taken to mean any type of fish and fish meal. In this case, the filling consists of a mixture based on a product chosen from vegetable oil, animal oil and yeast powder.

If the process is carried out to produce food for human consumption, products can be manufactured especially with an outer casing which is cereal based and with a filling which is either semi-liquid chocolate, almond paste or cocoa powder. In this case, the outer casing is prepared from a mixture of flour, water, sugar, salt, colourings and flavouring.

It is also possible to envisage the manufacture, according to the process of the invention, of pasta products stuffed with meat, or balls of cereal stuffed with cream.

The temperature profile of the extruder is between 120° and 200° C. If animal foodstuffs are being manufactured, the process is carried out at temperatures of between 150° and 160° C. When food for human consumption is being manufactured, the temperature profile is from 120° to 140° C. The filling is normally introduced at ambient temperature or above.

When the coextruded sausage comes out of the coextrusion die, it is cooled at a temperature of about 70° C. and subjected to a shaping process which lasts about one second.

After the shaping, the coextruded product is cooled again to a temperature of between 20° and 70° C.

In the extruder the process is carried out at an output of 150 to 600 kg/h. When producing foodstuffs for human consumption, the output is closer to 150 kg/h, whereas higher yields can be achieved when animal foodstuffs are being produced, for example between 300 and 600 kg/h. The rate of travel of the coextruded sausage is about 10 to 40 m/min.

The production line is very compact and its dimension is about 20 m. As an extruder, a twin-screw system is used, for example those produced by Clextral or Werner Pfleiderer. Its length is between 1.2 and 1.8 m.

The coextruder head is round, about 20 mm in diameter, and has a filling feed duct which is substantially at the centre of the flow of paste.

The shaper is of the type used in the confectionery industry to manufacture sweets, comprising an outer annulus equipped with moulds, off-centre with respect to a ring body also equipped with moulds, both being mounted so as to rotate and driven concomitantly by a single motor so as to shape the coextruded product continuously. The two components are off-centre so as to enable the extruded sausages to enter, to be shaped as such and to be expanded.

The coextruded product comes out at a temperature of about 70° C., passes onto a conveyor belt and finally arrives at a system for cooling by air at ambient temperature in one or two stages.

The process and device according to the invention enable a coextruded product to be manufactured in which there is no risk of the filling flowing out, with high productivity, without waste and using a very compact production line.

The following part of the description is given with reference to the drawings.

DETAILED DESCRIPTION OF THE DRAWINGS AND OPERATION

Figure 1:
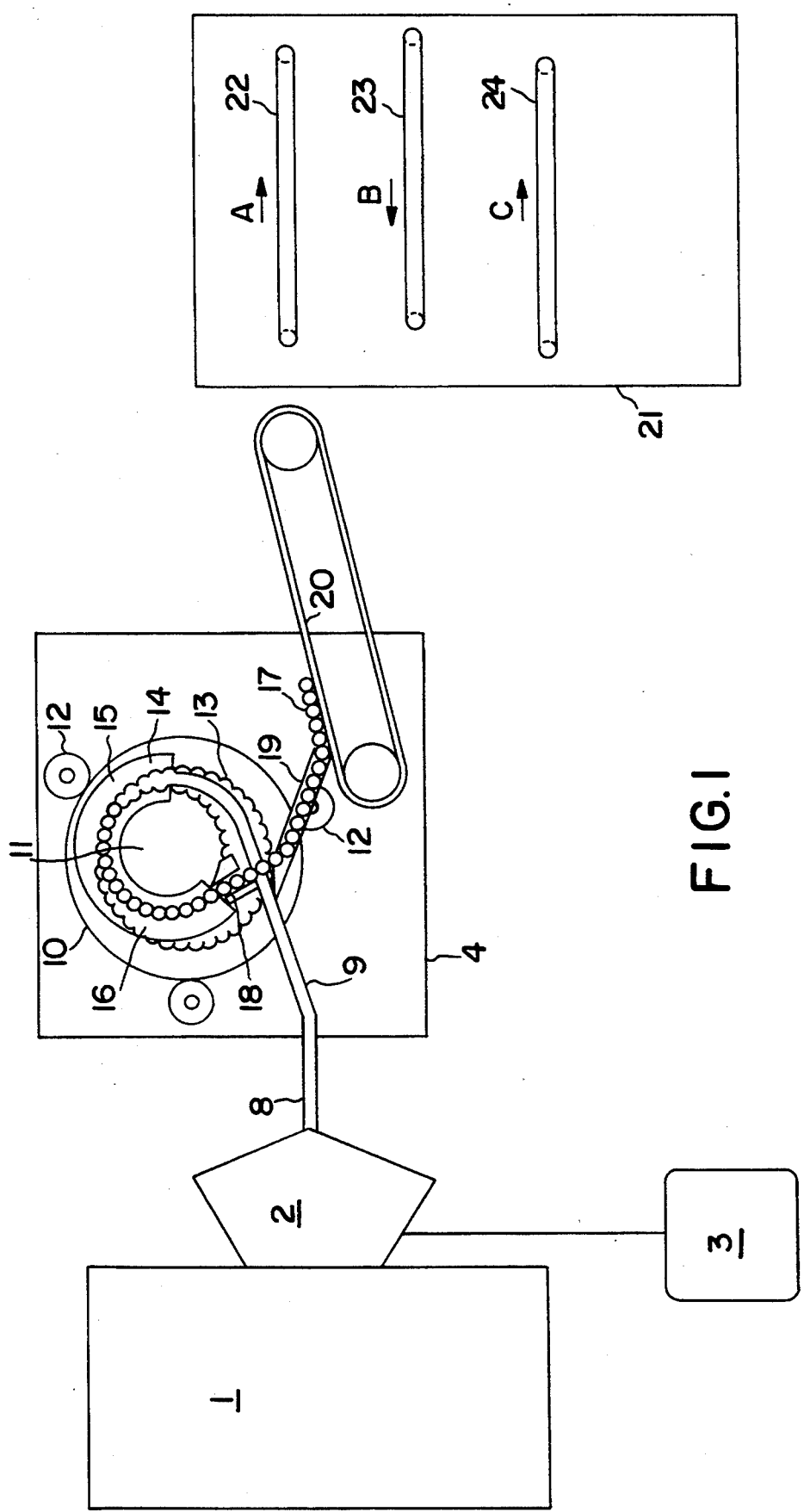
FIG. 1 shows the device according to the invention diagrammatically.
Figure 2:
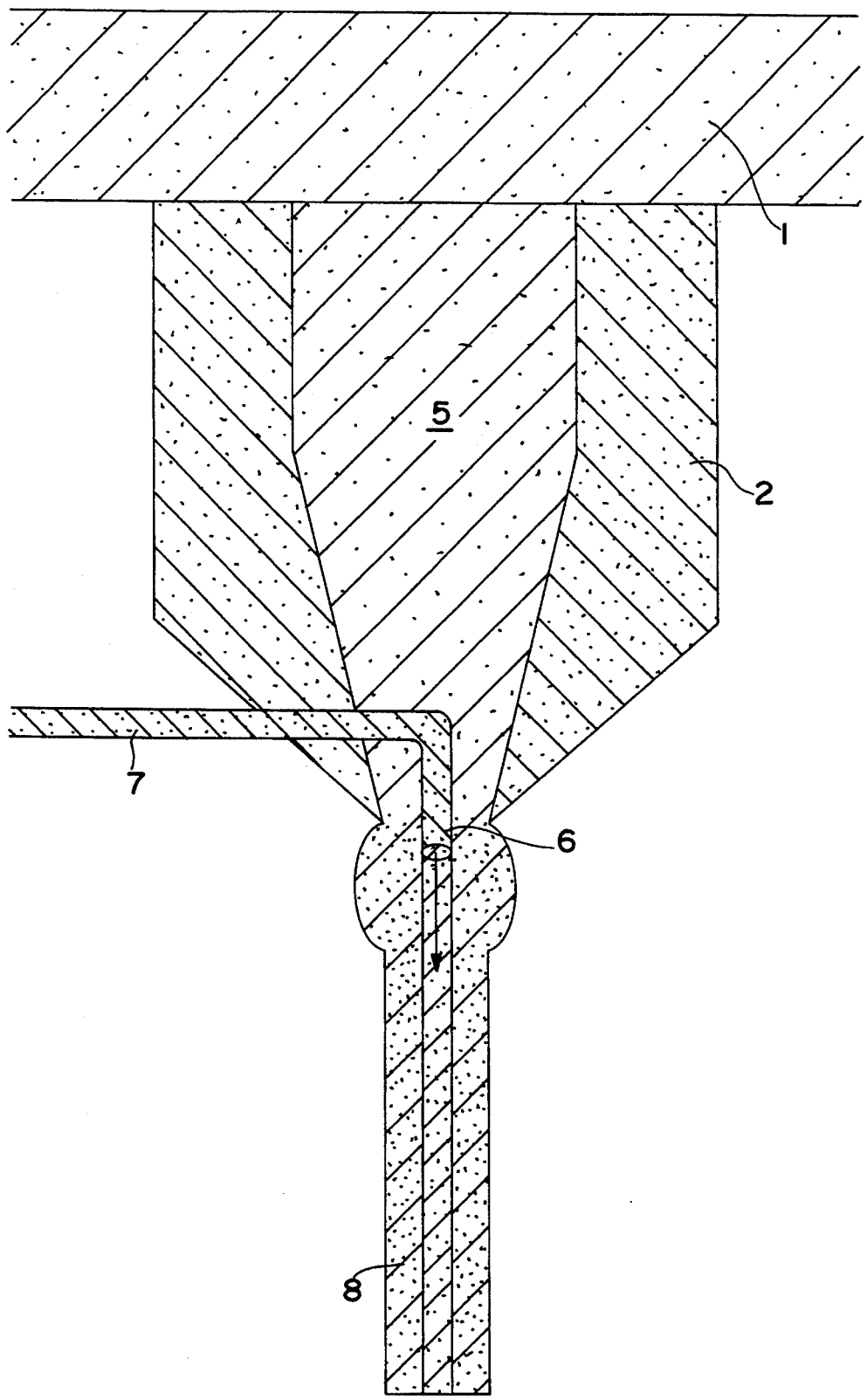
FIG. 2 shows the coextruder head diagrammatically.

In operation, the extruder (1), as shown in FIGS. 1 and 2, is loaded with the desired raw material, for example, for an animal foodstuff, with flours and a meat suspension. Having regard to the temperature profile, for example about 150° to 160° C., the paste (5) which arrives at the coextruder head (2) is cooked. The pumping system (3) conveys the filling (6) through the pipe (7) into the middle of the mass of paste (5). A coextruded sausage (8) is then obtained which, after suitable profiling, is conveyed towards the shaper (4).

This shaper is, for example, of the UNIPLAST type made by Bosch and comprises a feed (9) for the extruded sausage and an outer annulus system (10) equipped with moulds, off-centre with respect to a ring body (11), both being driven in rotation by a system (12) operating the transmission between a motor (not shown) and the said ring concomitantly. The sausage (8) enters at (13), is subjected to an initial shaping process at (14) and arrives at (15) at a separation point, then towards an expansion at (16). The coextruded products (17) are then ejected at (18) and conveyed from a feed chute (19) towards the conveyor belt (20), and then towards the air cooling system (21) which has three stages. The products (17) are conveyed on a conveyor belt (22) in the direction of the arrow A, fall onto the conveyor belt (23) in the direction of the arrow (B) and finally fall onto the conveyor belt (24) in the direction of the arrow (C), where they are ready to be packaged in air-tight packaging.

The device according to the invention can also be used to manufacture foodstuffs for human consumption, such as cereal balls stuffed with chocolate.

EXAMPLES

The following part of the description is given with reference to examples.

Example 1

This example concerns a method of implementing the process according to the invention for animal foodstuffs.

A mixture is made in the extruder of 50% by weight of meat suspension, with 40% of a mixture of flours and 10% of preservative suspension.

The meat suspension is obtained by crushing blocks frozen to −21° C., then grinding, then pulverising them and mixing potassium sorbate, flavouring and antioxidants in a dough mixer. The meat used is a 50/50 mixture of lungs and pork.

For the flours, a mixture is made using simply potato starch, glucose, blood plasma and wheat gluten.

For the preservative suspension, phosphoric acid, glycerol and hydrolysed whey are mixed in a dough mixer.

The three components described above are introduced separately into a CLEXTRAL BC 72 extruder. The extruder rings are at a temperature of 22°, 28°, 140° and 160° C. The meat and flour are loaded at a rate of 125 kg/h and the preservative suspension at 25 kg/h.

A filling consisting of a mixture of soya oil and yeast is used to make it more appetising. This stuffing is conveyed to the coextruder head at a rate of 25 kg/h.

The stuffed sausage comes out at a speed of 15 m/min and is cooled by circulating water around the sausage (double-casing cooler). It has a diameter of 20 mm. It is conveyed to a UNIPLAST 160 shaper which rotates at a speed adjusted to the speed of arrival of the coextruded sausage.

The coextruded products are then cooled on a belt cooler with three levels.

An output of 300 kg per hour is achieved.

Tasting tests carried out on these products give superior results to those of known products at present on the market.

Example 2

This example concerns a method of implementing the process according to the invention for products for human consumption. In this case, the process is carried out with a casing comprising 80% cereals, 10% sugar and 10% water and the combined cooking and extrusion take place at 160° C.

The filling consists of 80% chocolate and 20% ground almonds. The coextruded sausage comes out at a speed of 15 m/min.

We claim:

1. An apparatus for preparing a co-extruded shaped product comprising:
   an extruder for extruding a foodstuff wherein the extruder terminates in an extrusion head having a product outlet die and having a feed duct pipe for feeding a foodstuff filler material into the foodstuff extruded through the head so that the extruded foodstuff encases the filler material so that a foodstuff-encased product passes through the outlet die;
   a shaper positioned for receiving the encased product directly from the outlet die and having an inner rotatable ring body mold and outer rotatable annulus having molds wherein the outer annulus molds are positioned about and off-center of and are rotatable with the inner ring body mold so that upon rotation, the annulus molds and the ring body mold converge for shaping the encased product and then the annulus molds separate from the shaped product; and
   a system for cooling the shaped product positioned for receiving the shaped product.

2. An apparatus according to claim 1 wherein the system for cooling the shaped product comprises a plurality of conveyor belts positioned one above the other.

3. An apparatus according to claim 1 further comprising a conveyor belt positioned for receiving the shaped product from the shaper and for conveying the shaped product to the system for cooling the shaped product.

4. An apparatus according to claim 1 wherein the outlet die is round.

5. An apparatus according to claim 1 wherein the extruder is an extrusion-cooker extruder.

6. An apparatus according to claim 1 wherein the extruder is a twin-screw extruder.

7. An apparatus according to claim 1 wherein the system for cooling the shaped product is an air cooling system.

* * * * *